United States Patent
Oh et al.

(10) Patent No.: US 12,358,933 B2
(45) Date of Patent: Jul. 15, 2025

(54) META-POSS (META-POLYHEDRAL OLIGOMERIC SILSESQUIOXANE) COMPOUND, A PREPARATION METHOD THEREOF, AND A COMPOSITION CONTAINING THE META-POSS COMPOUND PREPARED BY THE PREPARATION METHOD

(71) Applicant: PIOCEL CO., LTD., Daejeon (KR)

(72) Inventors: SangSoo Oh, Sejong-si (KR); Myeongjun Kim, Daegu (KR); Ilkwon Oh, Sejong-si (KR)

(73) Assignee: PIOCEL CO., LTD., Daejeon (KR)

( * ) Notice: Subject to any disclaimer, the term of this patent is extended or adjusted under 35 U.S.C. 154(b) by 0 days.

(21) Appl. No.: 18/727,068

(22) PCT Filed: Nov. 8, 2022

(86) PCT No.: PCT/KR2022/017459
§ 371 (c)(1),
(2) Date: Jul. 5, 2024

(87) PCT Pub. No.: WO2023/153586
PCT Pub. Date: Aug. 17, 2023

(65) Prior Publication Data
US 2025/0109153 A1    Apr. 3, 2025

(30) Foreign Application Priority Data

Feb. 8, 2022 (KR) .......... 10-2022-0015979
Jul. 26, 2022 (KR) .......... 10-2022-0092195

(51) Int. Cl.
*C07F 7/21* (2006.01)
*C08K 5/549* (2006.01)
*C09D 7/63* (2018.01)

(52) U.S. Cl.
CPC .......... *C07F 7/21* (2013.01); *C08K 5/549* (2013.01); *C09D 7/63* (2018.01)

(58) Field of Classification Search
None
See application file for complete search history.

(56) References Cited

U.S. PATENT DOCUMENTS 9,259,509 B2 * 2/2016 Song .............. A61P 19/00
2010/0029804 A1 * 2/2010 Nakayama ....... C08G 18/3876
522/172

(Continued)

FOREIGN PATENT DOCUMENTS

CN     104086587 A    10/2014
JP     2004-143449 A   5/2004

(Continued)

OTHER PUBLICATIONS

Chunxin Zhang et al., "Highly Porous Polyhedral Silsesquioxane Polymers. Synthesis and Characterization", J. Am. Chem. Soc., 1998, pp. 8380-8391, vol. 120, No. 33.

(Continued)

*Primary Examiner* — Peter A Salamon
(74) *Attorney, Agent, or Firm* — You & IP, LLC

(57) ABSTRACT

The present invention relates to a novel meta-polyhedral oligomeric silsesquioxane (meta-POSS) compound as a modified polyhedral oligomeric silsesquioxane, which is a polysiloxane-based compound, a preparation method thereof, and a composition containing the meta-POSS compound prepared by the preparation method. The novel meta-POSS compound is characterized by including a structural unit of —Si—O—R2-O—Si—.

23 Claims, 4 Drawing Sheets

(56) References Cited

U.S. PATENT DOCUMENTS

| | | | | |
|---|---|---|---|---|
| 2013/0144025 A1* | 6/2013 | Hwang | ............. | C08G 77/08 |
| | | | | 528/14 |
| 2014/0255333 A1* | 9/2014 | Song | ............. | A61P 19/00 |
| | | | | 424/78.17 |

FOREIGN PATENT DOCUMENTS

| | | | |
|---|---|---|---|
| JP | 2004-529984 | A | 9/2004 |
| JP | 2004-359933 | A | 12/2004 |
| JP | 2006-022207 | A | 1/2006 |
| JP | 2006-269402 | A | 10/2006 |
| JP | 5611544 | B2 | 10/2014 |
| KR | 10-2012-0017133 | A | 2/2012 |
| KR | 10-2019-0136553 | A | 12/2019 |
| KR | 10-2023-0119792 | A | 8/2023 |

OTHER PUBLICATIONS

Korean Office Action mailed on Jun. 14, 2024.

\* cited by examiner

META-POSS (META-POLYHEDRAL OLIGOMERIC SILSESQUIOXANE) COMPOUND, A PREPARATION METHOD THEREOF, AND A COMPOSITION CONTAINING THE META-POSS COMPOUND PREPARED BY THE PREPARATION METHOD

TECHNICAL FIELD

The present invention relates to a novel meta-polyhedral oligomeric silsesquioxane (meta-POSS) compound as a modified polyhedral oligomeric silsesquioxane, which is a polysiloxane-based compound, a preparation method thereof, and a composition containing the meta-POSS compound prepared by the preparation method.

BACKGROUND ART

Polysiloxane-based compounds are used in various industries because of their excellent advantages in heat resistance, cold resistance, weather resistance, light resistance, chemical stability, electrical properties, flame retardancy, water resistance, transparency, colorability, non-adhesiveness, and non-corrosiveness.

Among polysiloxane-based compounds, polyhedral oligomeric silsesquioxane (POSS) is known to have excellent weather resistance, heat resistance, physical properties, optical properties, chemical stability, and low dielectric properties because of its specific chemical structure. In particular, it is used in industries such as electronic materials, optical materials, electronic optical materials, paints, and primers.

Meanwhile, as compounds of POSS, compounds having various functional groups such as epoxy group, (meth)acryloyl group, vinyl group, hydrolyzable silyl group, oxetanyl group, and phenyl group have been reported (Patent documents 1 to 6).

All of such conventionally known POSS compounds are in the form of having Si atoms and substituted functional groups. Due to these multifunctional groups, the POSS compounds are generally solid compounds, which makes it difficult to control the reaction, and in particular, has problems of low handling and molding processability.

Therefore, in addition to weather resistance, heat resistance, physical properties, optical properties, chemical stability, and low dielectric properties, which are characteristics of conventional POSS-based compounds, there is a demand for the development of a new POSS-based compound with improved handling and molding processability.

DISCLOSURE

Technical Problem

Objects of the present invention are to provide a novel meta-POSS compound, which is a new POSS-based compound having improved handling and molding processability in addition to weather resistance, heat resistance, physical properties, optical properties, chemical stability, and low dielectric properties, a preparation method thereof, and a composition containing the meta-POSS compound prepared by the preparation method.

Technical Solution

In order to accomplish the above objects, a novel meta-POSS (meta-polyhedral oligomeric silsesquioxane) compound of the present invention is characterized by including a structural unit of —Si—O—R2-O—Si— and may be a compound represented by General Formula (1) below.

$[(R1)SiO_3(R2)_{3/2}]a$   <General Formula (1)>

In General Formula (1), R1 is a functional group including an epoxy group, a (meth)acrylic group, a vinyl group, a hydrolysable silyl group, an oxetanyl group, a phenyl group, an aminoalkyl group, an alkoxy group, an alkyl group, a halogen alkyl group, an alkylhydroxy group (—(CH2)n-OH), an alkylthiol group (mercapto group, —(CH2)n-SH), or the like.

R2 may be an alkyl group, preferably a substituted or unsubstituted linear or branched C1 to C15 alkyl group, more preferably a substituted or unsubstituted linear or branched C1 to C5 alkyl group.

In General Formula (1), 'a' may be 8 to 24, preferably 8 to 20.

The novel meta-POSS compound represented by Genera Formula (1) is an oligomer having a molecular weight of 1,500 to 20,000, preferably 1,500 to 15,000.

A preparation method of the compound of the present invention represented by Genera Formula (1) includes:
i) a step of reacting silane and diol in a diluent solvent using a catalyst ('reaction step'); and
ii) a step of leaving a reaction mixture of the reaction step i) to be cooled and purifying the reaction mixture in vacuum ('purification step').

In addition, a composition containing the novel meta-POSS compound of the present invention is characterized by including the meta-POSS compound represented by General Formula (1), a diluent monomer, an initiator, and an additive.

Advantageous Effects

The novel meta-POSS compound of the present invention has advantages of improved handling and molding processability by increased flexibility and reduced curing shrinkage in addition to weather resistance, heat resistance, physical properties, optical properties, chemical stability, and low dielectric properties.

Accordingly, the novel meta-POSS compound of the present invention and the composition including the same are applicable to various industries and, in particular, exhibit effects of increasing usability in industries such as electronic materials, optical materials, and electronic optical materials.

In addition, the preparation method of the novel meta-POSS compound of the present invention exhibiting the above advantages and effects is a simple reaction of a silane compound and a diol to make it possible to realize a mass production, so the utilization in various industries is great.

BEST MODE FOR DISCLOSURE

Figure 1:
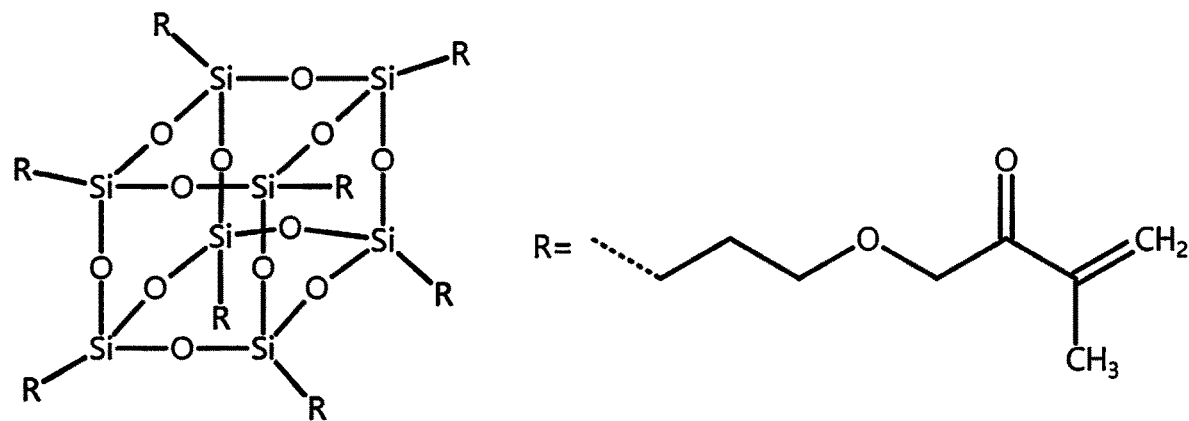
FIG. 1 shows the structure of a conventional POSS compound.
Figure 2:
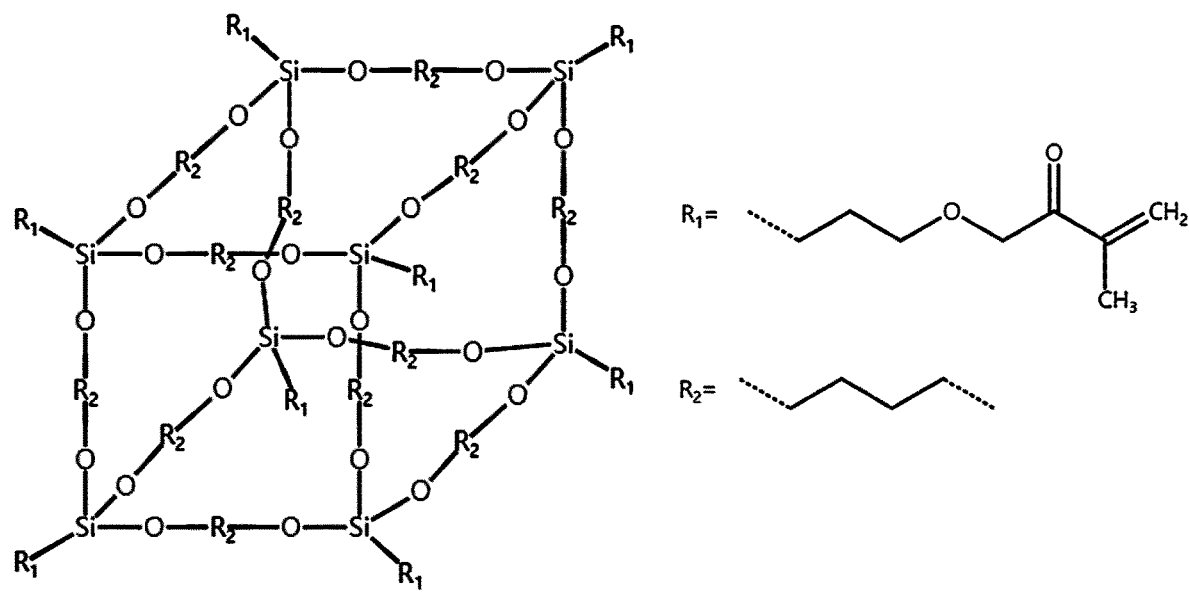
FIG. 2 shows the structure of a novel meta-POSS compound (a=8) of General Formula (1) according to the present invention.
Figure 3:
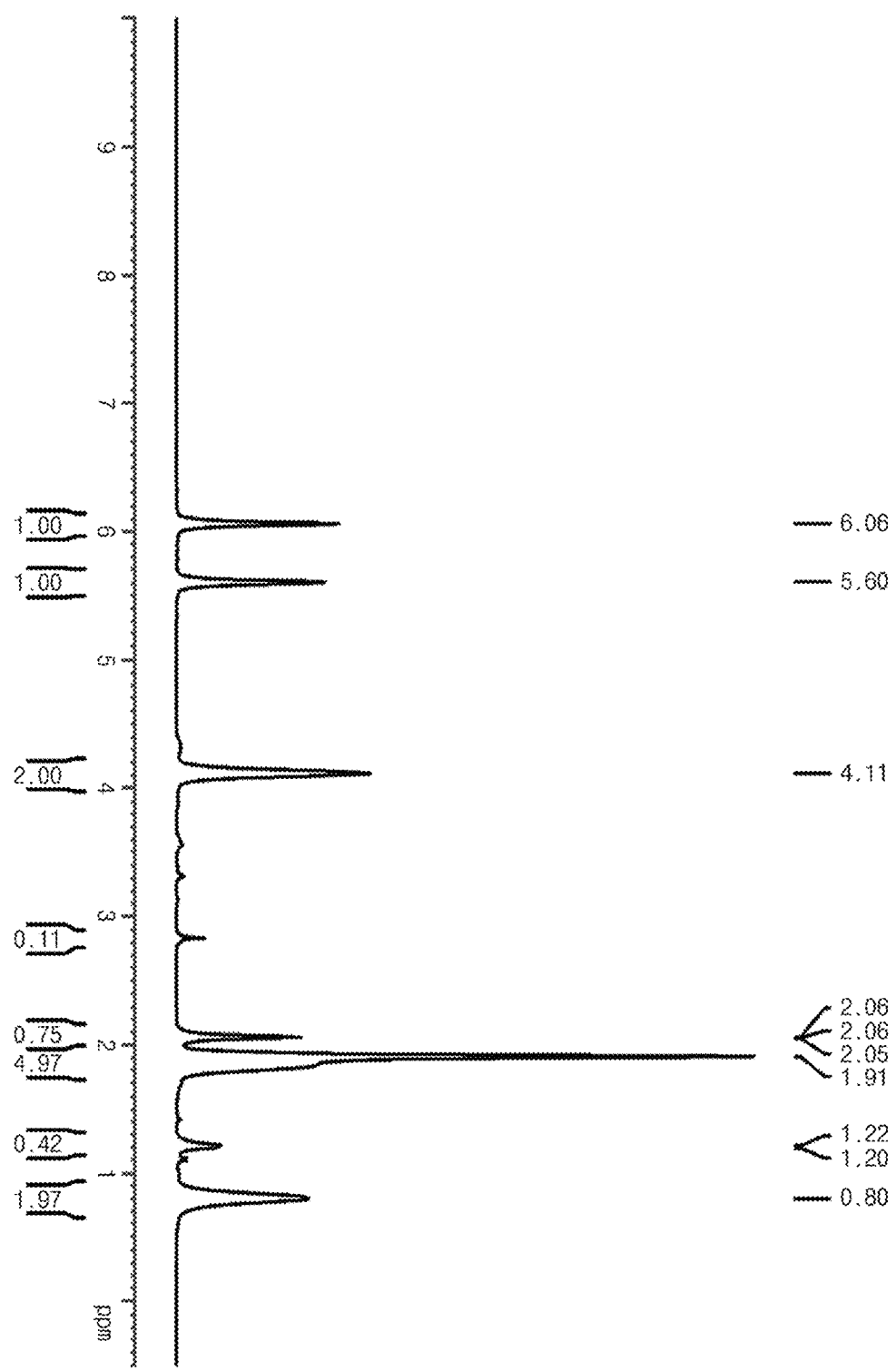
FIG. 3 shows the NMR of a conventional POSS compound (a=8).

Hereinafter, the present invention will be described in detail to help understanding of the present invention. The terms or words used in this description and claims should not be construed as being limited to ordinary or dictionary meanings, and should be construed in light of the meanings and concepts consistent with the technical idea of the present invention on the basis of the principle that the inventor can properly define his own invention as the concept of the term to describe it in the best way.

In the following, a novel meta-POSS (meta-polyhedral oligomeric silsesquioxane) compound, which is a new POSS-based compound of the present invention, a preparation method thereof, and a composition containing the meat-POSS compound prepared by the preparation method will be described in detail.

First, in one aspect of the present invention, the novel meta-POSS compound of the present invention is characterized by including a structural unit of —Si—O—R2-O—Si— and may be a compound represented by General Formula (1) below.

[(R1)SiO3(R2)3/2]a          <General Formula (1)>

In General Formula (1), R1 is a functional group including an epoxy group, a (meth)acrylic group, a vinyl group, a hydrolysable silyl group, an oxetanyl group, a phenyl group, an aminoalkyl group, an alkoxy group, an alkyl group, a halogen alkyl group, an alkylhydroxy group (—(CH2)n-OH), an alkylthiol group (mercapto group, —(CH2)n-SH), or the like.

R2 may be an alkyl group, preferably a substituted or unsubstituted linear or branched C1 to C15 alkyl group, more preferably a substituted or unsubstituted linear or branched C1 to C5 alkyl group.

In General Formula (1), 'a' may be 8 to 24, preferably 8 to 20.

The structure according to General Formula (1) may have the form of Chemical Formula (a) below.

<Chemical Formula (a)>

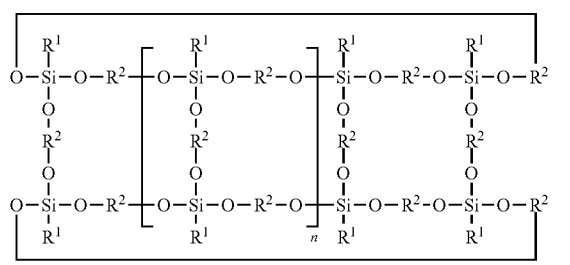

In Chemical Formula (a), 'n' may be 1 to 9, preferably 1 to 7.

In a specific form, when 'n' is 1, it may have the form of Chemical Formula (1) below.

<Chemical Formula (1)>

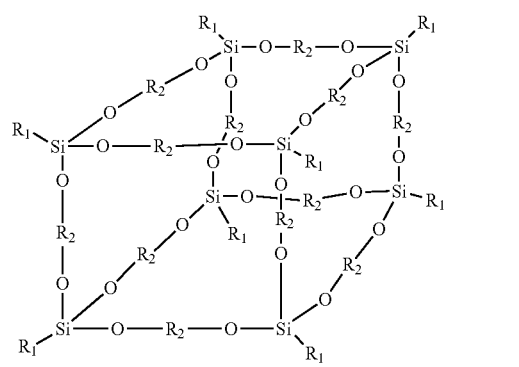

When 'n' is 2, it may have the form of Chemical Formula (2) below.

<Chemical Formula (2)>

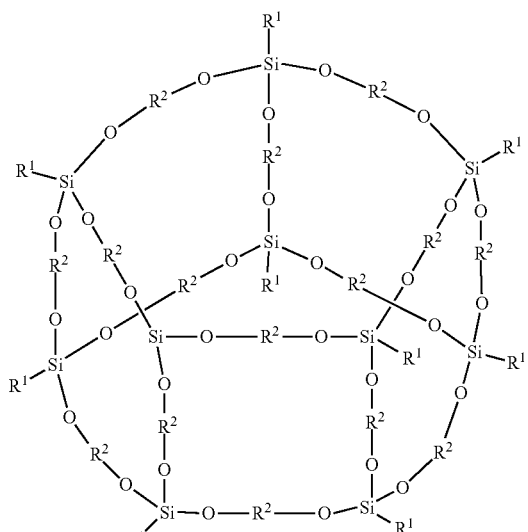

When 'n' is 3, it may have the form of Chemical Formula (3) below.

<Chemical Formula (3)>

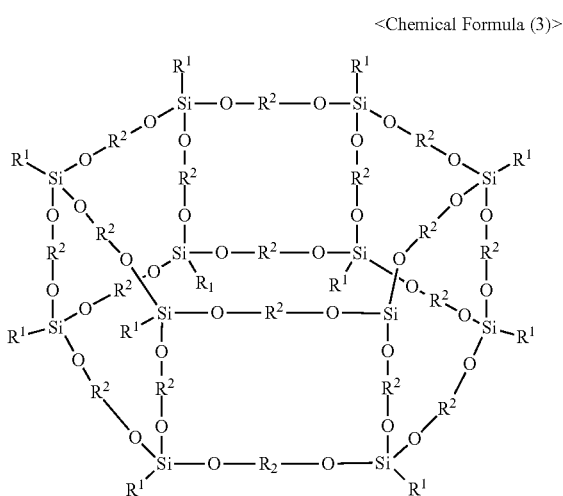

When 'n' is 4, it may have the form of Chemical Formula (4) below.

<Chemical Formula (4)>

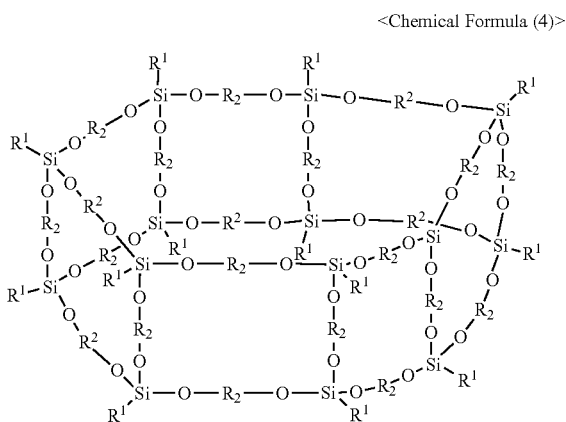

The novel meta-POSS compound represented by Genera Formula (1) is an oligomer having a molecular weight of 1,500 to 20,000, preferably 1,500 to 15,000.

Next, in another aspect of the present invention, a preparation method of the novel meta-POSS compound of the present invention is characterized by reacting a silane compound and a diol in a diluent solvent using a catalyst to obtain the structure of General Formula (1) above.

Specifically, the preparation method includes:
i) a step of reacting silane and diol in a diluent solvent using a catalyst ('reaction step'); and
ii) a step of leaving a reaction mixture of the reaction step i) to be cooled and purifying the reaction mixture in vacuum ('purification step').

The reaction step i) includes (a) a raw material input step; (b) a temperature raising and heating step; and (c) a synthesis step.

The raw material input step (a) is a step of inputting a diluent solvent, a silane compound, and a diol into a reactor, and adding a catalyst while stirring at room temperature.

As the diluent solvent, a polar solvent is used to dissolve well with alcohol, which is a by-product generated during a POSS reaction in the reaction step i). However, the same alcohol as the by-product alcohol is not used as the diluent solvent for forward progress of the reaction because it is a reaction by-product of the silane compound and the diol.

The polar solvent as the diluent solvent includes, for example, hydrophilic solvents such as linear or branched C1 to C6 alcohols such as methanol, ethanol, propanol, iso-propanol, n-butanol, iso-butanol, t-butanol, n-pentanol, iso-pentanol, and hexanol; and ketones such as acetone, MEK, and MIBK, and one or more of the above polar solvents may be used.

The amount of the diluent solvent used may be 30 to 70% by weight, preferably 30 to 60% by weight, of the total amount (parts by weight, wt) of the catalyst, the diluent solvent, the silane, and the diol.

The silane compound may be any one of organo trialkoxy silane-based compounds represented by General Formula (2) below.

$$R1Si(OR3)3$$ <General Formula (2)>

In General Formula (2), R1 is, as an organic group, a functional group including an epoxy group; a (meth)acrylic group; a vinyl group; a hydrolysable silyl group; an oxetanyl group; a phenyl group; an aminoalkyl group; a substituted or unsubstituted alkoxy group; a substituted or unsubstituted alkyl group; a halogen alkyl group; an alkylhydroxy group (—(CH2)n-OH); an alkylthiol group (mercapto group, —(CH2)n-SH); or the like.

R3 is a substituted or unsubstituted C1-C15 alkyl group.

Examples of the organo trialkoxy silane-based compounds may be, but are not limited to, the following compounds.

(3-ACRYLOXYPROPYL)TRIMETHOXY SILANE, [4369-14-6]
METHACRYLOXYPROPYL TRIMETHOXY SILANE, [2530-85-0]
METHACRYLOXYMETHYL TRIETHOXY SILANE, [5577-72-0]
METHACRYLOXYMETHYL TRIMETHOXY SILANE, [54586-78-6]
METHACRYLOXYPROPYL TRIETHOXY SILANE, [21142-29-0]
3-AMINOPROPYL TRIETHOXY SILANE, [919-30-2]
3-AMINOPROPYL TRIMETHOXY SILANE, [13822-56-5]
4-AMINOBUTYL TRIETHOXY SILANE, [3069-30-5]
m-AMINOPHENYL TRIMETHOXY SILANE, [70411-42-6]
2-(3,4-EPOXYCYCLOHEXYL)ETHYL TRIETHOXY SILANE, [10217-34-2]
2-(3,4-EPOXYCYCLOHEXYL)ETHYL TRIMETHOXY SILANE, [3388-04-3]
(3-GLYCIDOXYPROPYL)TRIMETHOXY SILANE, [2530-83-8]
(3-GLYCIDOXYPROPYL)TRIETHOXY SILANE, [2602-34-8]
3-MERCAPTOPROPYLTRIMETHOXYSILANE, [4420-74-0]
3-MERCAPTOPROPYLTRIETHOXYSILANE, [14814-09-6]
ALLYLTRIMETHOXYSILANE, [2551-83-9]
HEXENYLTRIETHOXYSILANE, [52034-14-7]
7-OCTENYLTRIMETHOXYSILANE, [52217-57-9]
METHYL TRIMETHOXY SILANE, [1185-55-3]
METHYL TRIETHOXY SILANE, [2031-67-6]
PHENYL TRIETHOXY SILANE, [780-69-8]
PHENYL TRIMETHOXY SILANE, [2996-92-1]
HYDROXYMETHYLTRIETHOXYSILANE

N,N-BIS(2-HYDROXYETHYL)-3-AMINOPROPYL-
TRIETHOXYSILANE
[HYDROXY(POLYETHYLENEOXY)PROPYL]TRI-
ETHOXYSILANE
(HYDROXYETHYL)-METHYLAMINOPROPYLT-
RIMETHOXYSILANE

The amount of silane used may be 15 to 40% by weight, preferably 20 to 35% by weight, of the total amount (parts by weight, wt) of the catalyst, the diluent solvent, the silane, and the diol.

The diol is any one of substituted or unsubstituted linear or branched diols having C1 to C15 carbon atoms, and such diols may be, but are not limited to, the following.
1,2-Ethanediol
1,3-Propanediol
1,4-Butanediol
1,5-Pentanediol
1,6-Hexanediol
1,8-Octanediol
1,10-Decanediol
1,12-Dodecanediol The amount of the diol used may be 10 to 30% by weight, preferably 15 to 30% by weight, of the total amount (parts by weight, wt) of the catalyst, the diluent solvent, the silane, and the diol.

The amount of silane and diol used is a ratio (molar ratio) of 2:3, and is determined according to the number of 'a' in General Formula (1).

For example, the molar ratio of silane and diol used must be an amount that can satisfy 8:12 in the case of a=8, an amount that can satisfy 10:15 in the case of a=10, and an amount that can satisfy 12:18 in the case of a=12.

The catalyst is any one or more selected from catalysts including strong acids such as HCl, HNO3, and H2SO4; strong bases such as NaOH, KOH, and BaOH; and ammonium salts such as TMAH (Tetra Methyl Ammonium Hydroxide), TMAA (Tetra Methyl Ammonium Acetate), TMAF (Tetra Methyl Ammonium Fluoride), TEAH (Tetra Ethyl Ammonium Hydroxide), TEAA (Tetra Ethy 1Ammonium Acetate), TEAF (Tetra Ethyl Ammonium Fluoride), TBAH (Tetra Butyl Ammonium Hydrocide), TBAA (Tetra Butyl Ammonium Acetate), and TBAF (Tetara Butyl Ammonium Fluoride).

The amount of the catalyst used may be 0.01 to 5% by weight, preferably 0.05 to 5% by weight, of the total amount (parts by weight, wt) of the catalyst, the diluent solvent, the silane, and the diol.

The temperature raising and heating step (b) is a step of raising the reaction temperature of the reaction mixture of the raw material input step (a) to 60 to 100° C., preferably 70 to 85° C.

The synthesis step (c) is a step of continuing the reaction while maintaining the reaction temperature raised in the heating and temperature raising step (b), and recovering a diluent solvent and a reaction by-product alcohol, which are volatilized as the reaction proceeds. The recovery may use a typical method.

Figure 5:
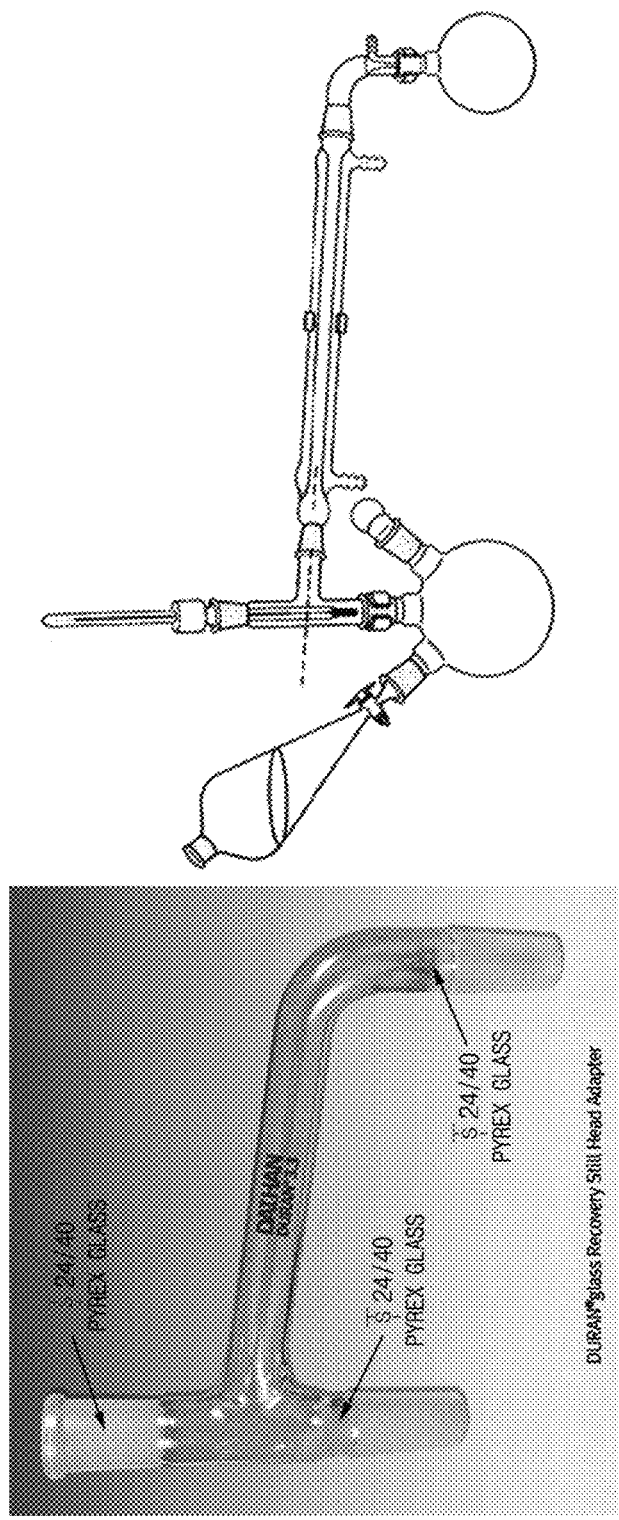
FIG. 5 shows a typical apparatus used in a preparation method of a novel meta-POSS compound according to the present invention.

Preferably, using a recovery still adapter, the volatilized diluent and the volatilized reaction by-product alcohol are condensed and recovered in a condenser (See FIG. 5).

In the synthesis step (c), the synthesis reaction proceeds while adding and replenishing a diluent solvent into the reactor by the amount of the diluent solvent volatilized during the reaction. The diluent solvent may be added during ⅓ to ½ of the total reaction time in an amount of 5% to 30% by weight, preferably 10% to 20% by weight, of the amount of the solvent initially used. Such addition of the diluent solvent has an advantage of securing the uniformity of the reaction by maintaining an appropriate concentration of the diluent solvent in the reactor.

The reaction time of the reaction step i) including the above steps (a) to (c) may be 6 to 48 hours.

The purification step ii) is a step of obtaining a meta-POSS compound of General Formula (1) of the present invention, which is a reaction product, by leaving a reaction mixture of the reaction step i) to be cooled and then purifying the reaction mixture in vacuum.

In the purification step ii), leaving the reaction mixture of the reaction step i) to be cooled is a process of leaving the reaction mixture passed through the steps (a) to (c) to be cooled at a temperature below room temperature. Then, the reaction mixture of the reaction step i) is separated into an upper layer of a liquid phase and a lower layer of a slurry phase. In the upper layer of the liquid phase, there are mainly unreacted reactants and the diluent solvent. In the lower layer of the slurry phase, in addition to the meta-POSS compound represented by General Formula (1) of the present invention, which is a reaction product, a part of the diluent solvent, and alcohol and water produced by the reaction may be contained.

In the purification step ii), vacuum purification is a process of separating the upper layer and the lower layer formed by the leaving process and removing in a vacuum the excess diluent solvent, the alcohol and the water from the lower layer of the slurry phase in order to finally obtain the meta-POSS compound represented by General Formula (1) of the present invention.

The diluent solvent and unreacted reactants (substances such as silane and diol) separated from the upper and lower layers can be reused after purification.

Next, in yet another aspect of the present invention, a composition containing the meta-POSS compound prepared by the preparation method of the present invention is characterized by including the meta-POSS compound represented by General Formula (1) below, a diluent monomer, an initiator, and an additive.

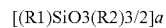 <General Formula (1)>

[(R1)SiO3(R2)3/2]a

In General Formula (1), R1 is a functional group including an epoxy group; a (meth)acrylic group; a vinyl group; a hydrolysable silyl group; an oxetanyl group; a phenyl group; an aminoalkyl group; a substituted or unsubstituted alkoxy group; a substituted or unsubstituted alkyl group; a halogen alkyl group; an alkylhydroxy group (—(CH2)n-OH); an alkylthiol group (mercapto group, —(CH2)n-SH); or the like.

R2 may be an alkyl group, preferably a substituted or unsubstituted linear or branched C1 to C15 alkyl group, more preferably a substituted or unsubstituted linear or branched C1 to C5 alkyl group.

In General Formula (1), 'a' may be 8 to 24, preferably 8 to 20.

The structure according to General Formula (1) may have the form of Chemical Formula (a) below.

<Chemical Formula (a)>

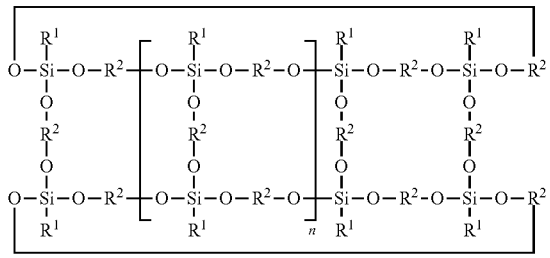

In Chemical Formula (a), 'n' may be 1 to 9, preferably 1 to 7.

The meta-POSS compound represented by General Formula (1) is an oligomer having a molecular weight of 1,500 to 20,000, preferably 1,500 to 15,000, is combined with the diluent monomer in the composition, and has 40 wt % to 95 wt %, preferably 50 wt % to 90 wt %, of the total composition.

The diluent monomer is a component added for viscosity control, curing properties, adhesion, flexibility, and the like of the composition.

The diluent monomer of the composition may be determined depending on the type of functional group of R1 in General Formula (1). For example, an acryl-based monomer is used as the diluent monomer when R1 is an acryl group, an epoxy-based monomer is used as the diluent monomer when R1 is an epoxy group, and an alkylhalogen-based monomer is used as the diluent monomer when R1 is an alkylhalogen group. When R1 includes all of an acrylate group, an epoxy group, and an alkylhalogen group, all of the acryl-based, epoxy-based, and alkylhalogen-based monomers may be used.

In addition, the diluent monomer used may vary depending on the curing properties of the product in which the composition is used.

For example, the diluent monomer having a low molecular weight and having a multifunctional group increases the curing density, so that the product exhibits very hard physical properties. In addition, the diluent monomer having a high molecular weight and a monofunctional group lowers the curing density, so that the product exhibits soft physical properties. When there are many fluorine groups in the diluent monomer, the refractive index of the product is lowered, the dielectric properties are improved, and the surface energy is reduced.

The compound of the diluent monomer may be one or more of the following exemplary compounds according to functions.

Exemplary compounds of an acryl-based diluent monomer for the function of the diluent monomer compound in the composition to have properties such as viscosity control, acrylic reactivity, and glass adhesion increase are as follows, but are not limited thereto.

METHACRYLOXY PROPYL TRIMETHOXY SILANE
    (3-ACRYLOXYPROPYL)TRIMETHOXYSILANE
    METHACRYLOXYMETHYLTRIMETHOXYSILANE
    (METHACRYLOXYMETHYL)BIS(TRIMETHYLSILOXY)METHYLSILANE
    (3-ACRYLOXYPROPYL)METHYLDIMETHOXYSILANE
    (3-ACRYLOXYPROPYL)METHYLDIETHOXYSILANE
    METHACRYLOXYPROPYLMETHYLDIMETHOXYSILANE
    METHACRYLOXYPROPYLMETHYLDIETHOXYSILANE
    METHACRYLOXYPROPYLDIMETHYLMETHOXYSILANE
    METHACRYLOXYPROPYLDIMETHYLETHOXYSILANE
    (ACRYLOXYMETHYL)PHENETHYLTRIMETHOXYSILANE
    (METHACRYLOXYMETHYL)DIMETHYLETHOXYSILANE
    METHACRYLOXYPROPYLTRIETHOXYSILANE
    (METHACRYLOXYMETHYL)METHYLDIMETHOXYSILANE
    METHACRYLOXYMETHYLTRIETHOXYSILANE
    ACRYLOXYMETHYLTRIMETHOXYSILANE
    METHACRYLOXYPROPYLTRIISOPROPOXYSILANE
    METHACRYLOXYMETHYLTRIS(TRIMETHYLSILOXY)SILANE
    (3-ACRYLOXYPROPYL)TRIS(TRIMETHYLSILOXY)SILANE
    (3-ACRYLOXYPROPYL)METHYLBIS(TRIMETHYLSILOXY)SILANE
    3-METHACRYLOXYPROPYLTRIACETOXYSILANE
    METHACRYLOXYPROPYLMETHYLDICHLOROSILANE
    (3-ACRYLOXYPROPYL)DIMETHYLMETHOXYSILANE
    (2-ACRYLOXYETHOXY)TRIMETHYLSILANE
    ACRYLOXYTRIISOPROPYLSILANE
    1,3-BIS(METHACRYLOXY)-2-TRIMETHYLSILOXYPROPANE
    1,3-BIS(3-METHACRYLOXYPROPYL)TETRAKIS(TRIMETHYLSILOXY) DISILOXANE
    O-(METHACRYLOXYETHYL)-N-(TRIETHOXYSILYLPROPYL) CARBAMATE
    O-(METHACRYLOXYETHOXY)CARBAMOYLPROPYLMETHYLDIMETHOXY SILANE
    N-(3-METHACRYLOXY-2-HYDROXYPROPYL)-3-AMINOPROPYLTRIETHOXYSILANE

Exemplary compounds of an epoxy-based diluent monomer for the function of the diluent monomer compound in the composition to have properties such as viscosity control, epoxy reactivity, and glass adhesion increase are as follows, but are not limited thereto.

(3-GLYCIDOXYPROPYL)TRIMETHOXYSILANE
    2-(3,4-EPOXYCYCLOHEXYL)ETHYLTRIMETHOXYSILANE
    (3-GLYCIDOXYPROPYL)TRIETHOXYSILANE
    (3-GLYCIDOXYPROPYL)METHYLDIMETHOXYSILANE
    (3-GLYCIDOXYPROPYL)METHYLDIETHOXYSILANE
    2-(3,4-EPOXYCYCLOHEXYL)ETHYLTRIETHOXYSILANE
    5,6-EPOXYHEXYLTRIETHOXYSILANE
    (3-GLYCIDOXYPROPYL)DIMETHYLETHOXYSILANE
    2-(3,4-EPOXYCYCLOHEXYL)ETHYLMETHYLDIETHOXYSILANE
    8-GLYCIDOXYOCTYLTRIMETHOXYSILANE
    1-(3-GLYCIDOXYPROPYL)-1,1,3,3,3-PENTAETHOXY-1,3-DISILAPROPANE

An amine-based silane diluent monomer can be used as the diluent monomer for the function of the diluent monomer compound in the composition to have properties such as viscosity control, reactivity with epoxy contained in a substrate, and glass adhesion increase. Exemplary compounds thereof are as follows, but are not limited thereto.

N-(2-AMINOETHYL)-3-AMINOPROPYLMETHYL-DIMETHOXYSILANE
(3-(N-ETHYLAMINO) ISOBUTYL)TRIMETHOXYSILANE
3-AMINOPROPYLTRIMETHOXYSILANE

Exemplary compounds of an acrylic-epoxy-based diluent monomer for the function of the diluent monomer compound in the composition to have properties such as viscosity control, acrylic-epoxy reactivity, and hardness increase are as follows, but are not limited thereto.

Glycidyl methacrylate
Glycidyl Acrylate
(3,4-Epoxycyclohexyl)methyl Acrylate
(3,4-Epoxycyclohexyl)methyl methacrylate Exemplary compounds of an epoxy-based diluent monomer containing a double bond as another monomer for the function of the diluent monomer compound in the composition to have properties such as viscosity control, reactivity with acryl-vinyl-epoxy, and hardness increase are as follows, but are not limited thereto.

Allyl glycidyl ether
1,2-Epoxy-4-vinylcyclohexane
2-Vinyloxytetrahydropyran
3-[(Allyloxy)methyl]-3-ethyloxetane
1,3-Butadiene Monoepoxide
1,2-Epoxy-9-decene
1,2-Epoxy-5-hexene Exemplary compounds of a halogen-based diluent monomer for the function of the diluent monomer compound in the composition to have properties such as viscosity control, acrylic reactivity, refractive index control, and water resistance increase are as follows, but are not limited thereto.

2-Perfluorobutyl ethyl acrylate
2-Perfluorohexyl ethyl acrylate
2-Perfluorooctyl ethyl acrylate
2-Perfluorodecyl ethyl acrylate
3-(Perfluorobutyl)propyl acrylate
3-Perfluorooctyl porpyl acrylate
2-Perfluorobutyl ethyl methacrylate
2-Perfluorohexyl ethyl methacrylate
2-Perfluorooctyl ethyl methacrylate
2-Perfluorodecyl ethyl methacrylate
3-Perfluorobutyl propyl methacrylate
3-Perfluorohexyl propyl methacrylate
3-Perfluorooctyl propyl methacrylate
1H,1H,5H-Octafluoropentyl methacrylate
1H,1H,2H,2H-Perfluorodecyltriethoxysilane
1H,1H,2H,2H-Perfluorodecyltrimethoxysilane
1H,1H,2H,2H-Perfluorodecyltrichlorosilane
Perfluorohexyl propyl epoxide
Perfluorooctyl propyl epoxide
2-Perfluorobutyl ethyl alcohol
2-Perfluorohexyl ethyl alcohol
2-Perfluorooctyl ethyl alcohol
2-Perfluorohexyl ethyl thiol
2-Perfluorooctyl ethyl thiol The diluent monomer as described above includes 1 wt % to 40 wt %, preferably 5 wt % to 35 wt %, of the total composition.

The initiator, as a photoinitiator, is for initiating bonding between the oligomer, which is the meta-POSS compound of General Formula (1), and the diluent monomer.

One or more types of initiator may be used, and examples of the initiator may include, but are not limited to, the following compounds.

BENZIL DIMETHYL KETAL
HYDROXY CYCLOHEXYL PHENYL KETONE
HYDROXY DIMETHYL ACETOPHENONE
METHYL-[METYLTHIO PHENYL]-MORPHOLINE PROPANONE
2,4-DIETHYLTHIOXANETHONE
ETHYL-4-DIMETHYLAMINOBENZOATE
BENZOPHENONE
4-PHENYLBENZOPHENONE
2,4,6-TRIMETHYLBENZOYL-DIPHENYL PHOSPHINE
METHYL BENZYLFORMATE
Bis [4-n-alkyl(C10~13)phenyl]iodonium Hexafluorophosphate
Bis [a-n-alkyl(C10~13)phenyl]iodonium Hexafluoroantimonate
Bis (4-tert-butylphenyl) iodium hexafluorophosphate
Bis [4-n-alkyl(C10~13)phenyl]iodonium tetrakispentafluorophenyl borate
1,2-Dicyclohexyl-4,4,5,5-tetramethylbiguanidium n-butyltriphenyl borate
IODONIUM, (4-METHYLPHENYL)[4-(2-METHYLPROPYL)PHENYL]-HEXAFLUORO PHOSPHATE Meanwhile, an appropriate initiator may be selected according to the used oligomer and monomer.

For example, when the oligomer and the monomer are acrylate-based compounds, a radical UV initiator may be used, and in particular, hydroxy cyclohexyl phenyl ketone (trade name, Omnirad 184) may be used.

In addition, when the oligomer and the monomer are epoxy-based compounds, a cationic UV initiator may be used such as Iodonium-methylphenyl-methylpropylphenyl Hexafluoro-phosphate.

The initiator includes 0.1 wt % to 5 wt %, preferably 1 wt % to 5 wt %, of the total composition.

The additive may be determined depending on the product to which the composition is applied.

When the product to which the composition is applied requires increased coating surface smoothness, increased surface slippage, increased hardness, etc., one or more of the following additives may be used, but is not limited thereto.

polysiloxanes (silicones additives)
polyacrylates (acrylate additives)
Polyether modification polysiloxane
Silicone macromers
Polymethylalkylsiloxanes
thermostable modified polysiloxane
Reactive silicones
polyether-modified dimethylsiloxanes In addition, when the product to which the composition is applied requires increased adhesion to materials, increased storage stability of blended materials, etc., one or more of the following additives may be used, but is not limited thereto.

Copolymer of acrylate epoxy urethane
Copolymer adsorbed on silicon dioxide
Solution of modified alkylene copolymer
Solution of a hydroxy functional copolymer with acidic groups
Solution of modified polyether (2-methoxy-1-methylethyl acetate)
Carboxylated Linear Low Density Polyethylene (maleicanydride)

In addition to the above additives, various known additives such as a curing retardant for storage stability of the composition; an adhesion accelerator for improving adhesion; an inorganic filler; a pigment; a phosphor; a coloring agent; a heat resistance improver; a release agent; and a dispersant for a packaging material may be further added in the composition of the present invention, if necessary.

The amount of the additive used is 0.1 wt % to 15 wt %, preferably 0.1 wt % to 10 wt %, of the total composition.

In a preparation method of the composition of the present invention, a resin oligomer solution (1) is prepared by stirring the oligomer of General Formula (1) and the monomer in a stirrer at room temperature until they become transparent. In another stirrer, an additive solution (2) is prepared by mixing the additive, the initiator, and a part of the monomer and stirring them at room temperature until completely transparently dissolved.

A finished product is prepared by mixing and stirring the resin oligomer solution (1) and the additive solution (2).

The composition of the present invention described above may be used for electronic devices such as a display; an OELD; a mobile phone; a tablet; a notebook; a monitor; and a TV, used as transparent materials or/and film materials such as glass; UTG; PET; CPI; PI; TAC; acrylic; and PC, or used as hard coating materials used in general paints for home appliances, furniture, automobiles, or the like.

In addition, the composition of the present invention may also be used as low dielectric constant materials such as an OLED insulating material; a touch screen insulating material; a mobile phone antenna insulating material, and an LED encapsulation material.

Furthermore, the composition of the present invention may also be used for medical purposes such as hydrogel type adhesive medical patch materials containing a drug such as a patch; a contact lens; a medical adhesive; and silicone for human body insertion.

Particularly, the composition of the present invention may also be used as semiconductor encapsulation materials such as EMC encapsulation of an ultra-thin semiconductor package, or optical materials such as an optical adhesive; an optical fiber coating agent; a cladding material; and a wave guide resin.

Hereinafter, embodiments of the present invention will be described in detail so that those skilled in the art can easily implement the present invention. However, the present invention may be embodied in many different forms and is not limited to the embodiments described herein.

MODE FOR DISCLOSURE

<A Meta-POSS Compound of the Present Invention, and a Preparation of a Composition Containing the Same>

Embodiment 1: <A Preparation of a Meta-POSS of the Present Invention>

Isopropyl alcohol (IPA) 500.00 g, methacryltrimethoxysilane 320.00 g (32%, 8 mole), and 1,4-butanediol 179.00 g (17.80%, 12 mole) were added to a reactor. While a mixture of the above reactants was stirred at room temperature, TBAF 75% aq (Aser) 1.00 g (0.10%, 0.016) was added.

The reaction temperature of the reactant mixture with a catalyst added was raised to 80° C. and reacted. While the reaction temperature is maintained at 80° C., MeOH and IPA volatilized in the reaction were recovered. After 3 hours from the start of the reaction, IPA 100 g was further added into the reactor. After maintaining the reaction time of 8 hours, the reactant mixture was left to cool to room temperature or lower. From a lower layer of resultantly formed lower and upper layers, MeOH and water which were formed by the reaction, and IPA which is a diluent solvent were removed in a vacuum. As a result, a target object, the meta-POSS compound of the present invention (in the case of n=8) 370 g (yield 87%) was obtained.

Figure 4:
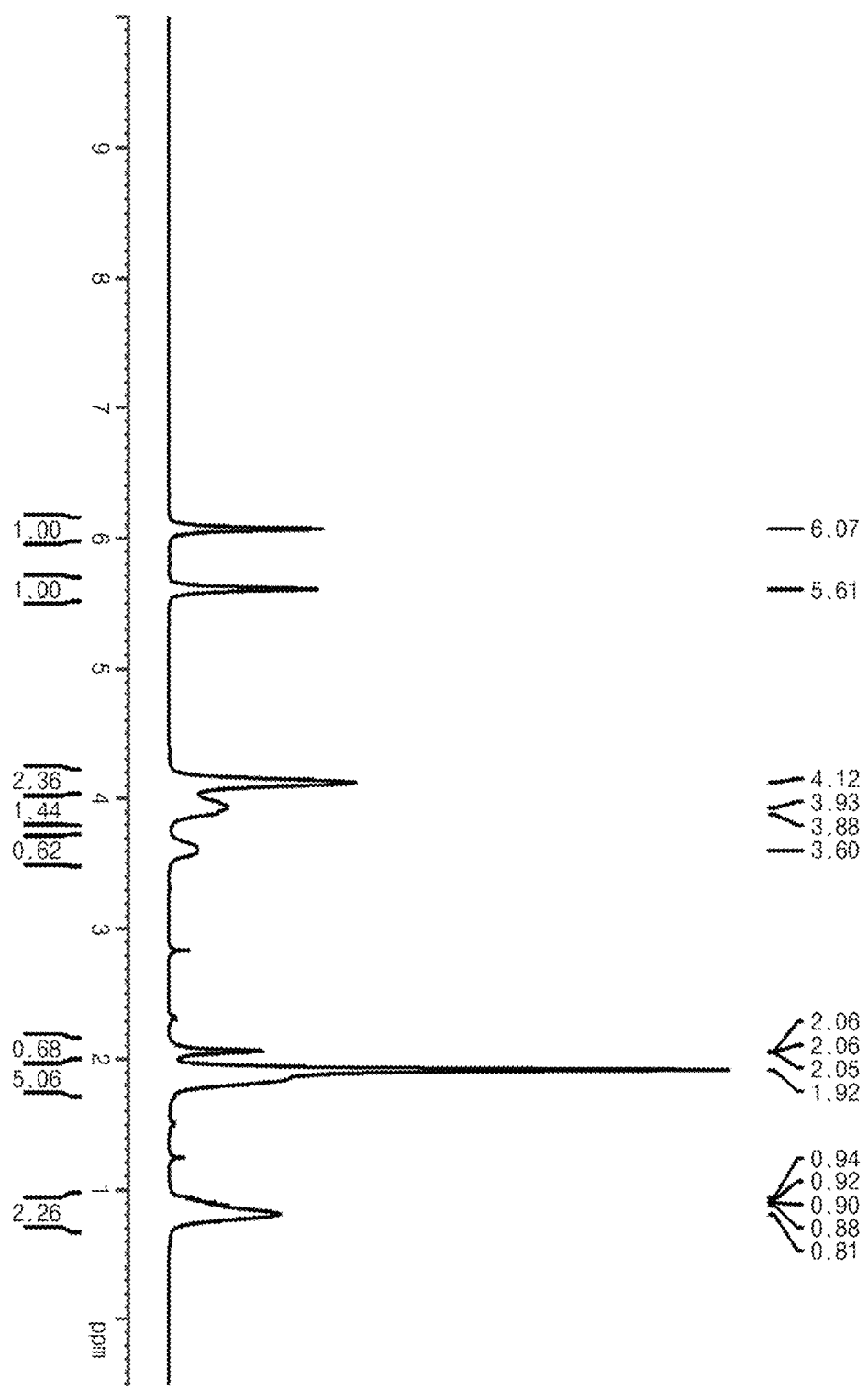
FIG. 4 shows the NMR of a novel meta-POSS compound (a=8) of General Formula (1) according to the present invention.

The NMR of the meta-POSS compound of the present invention (when n=8) is shown in FIG. 4.

Embodiment 2: <A Preparation of a Composition A1 of the Present Invention>

The composition of the present invention was prepared with components shown in Table 1 by the following preparation method of the composition. The composition prepared in Embodiment 2 of the present invention was prepared for coating for a display.

TABLE 1

| | Components | | Wt % | Input |
|---|---|---|---|---|
| 1) | Resin Oligomer | Meta-POSS | 87.0% | 870.0 g |
| 2) | Monomer | Hexandioldiacrylate | 10.0% | 100.0 g |
| 3) | Additive | BYK-333 | 0.3% | 3.0 g |
| 4) | Initiator | Omnirad 184 | 2.7% | 27.0 g |
| | Total | | 100.0% | 1,000 g |

<A Preparation Method of a Composition>

A resin oligomer solution (1) was prepared by inputting the above 1), 2), and 3) into a reactor and completely transparently stirring them at room temperature. A semi-finished solution (2) in which the additive was stirred was prepared by inputting the above 4) into another reactor and stirring it at room temperature until completely transparently dissolved. After mixing the solutions (1) and (2) and stirring them at room temperature, the composition (A1) was obtained by filtering.

Embodiment 3: <A Preparation of a Composition A2 of the Present Invention>

The composition (A2) of the present invention was prepared with components shown in Table 2 by the following preparation method of the composition.

TABLE 2

| | Component compounds | Wt % | Input |
|---|---|---|---|
| 1) | Resin Oligomer Meta-POSS (Compound prepared by preparation method of embodiment 1) | 60.0% | 600.0 g |
| 2) | Monomer Methacryloxy propyl trimethoxy silane | 10.0% | 100.0 g |
| 3) | Monomer Glycidoxy propyl trimethoxy silane | 10.0% | 100.0 g |
| 4) | Monomer Glycidyl methacrylate | 5.0% | 50.0 g |
| 5) | Monomer Perfluorohexyl ethyl methacrylate | 6.0% | 60.0 g |
| 6) | Additive BYK-333 | 3.0% | 30.0 g |
| 7) | Additive Acryl epoxy urethane copolymer | 3.0% | 30.0 g |
| 8) | Initiator Omnirad 184 | 3.0% | 30.0 g |
| | Total | 100.0% | 1000.0 g |

<A Preparation Method of a Composition>

A resin oligomer solution (1) was prepared by inputting the above 1), 3), 4), and 5) into a reactor and completely transparently stirring them at room temperature. A semi-finished solution (2) in which the additives were stirred was prepared by inputting the above 2), 6), 7), and 8) into another reactor and stirring them at room temperature until completely transparently dissolved. After mixing the solutions (1) and (2) and stirring them at room temperature, the composition (A2) was obtained by filtering. Physical properties of the prepared composition (A) are as follows.

Comparative Example 1: <A Preparation of a Conventional Composition B1>

Except for using a compound represented by Chemical Formula (b) below, which is a conventional cage-type silsesquioxane resin (POSS oligomer) compound, as the resin oligomer of the above 1) in Embodiment 2 (preparation of composition A1), a composition (B1) was obtained by the same method.

<Chemical Formula (b)>

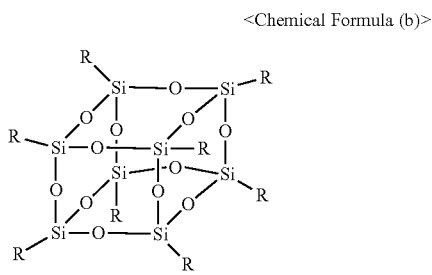

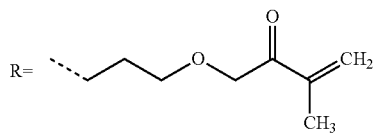

Comparative Example 2: <A Preparation of a Conventional Composition B2>

Except for using a compound represented by Chemical Formula (b) above, which is a conventional cage-type silsesquioxane resin (POSS oligomer) compound, as the resin oligomer of the above 1) in Embodiment 3 (preparation of composition A2), a composition (B2) was obtained by the same method.

<Comparison of Physical Properties Between the Composition (A1) of the Present Invention and the Conventional Composition (B1)>

(1) Adhesion Test (gf/cm)

For the 180° peel off test, the composition (Composition B1) of Comparative Example 1 and the composition (Composition A1) of Embodiment 2 were coated on a slide glass, covered with a PET (Polyethylene Terephthalate) film, and then cured by UV. After that, the first detaching force was measured by pulling the PET film in the direction of 180° from the adhesive surface. The conditions of the slide glass, the PET film, the coating thickness, and the UV light intensity are as follows.

Slide glass: 50 mm*75 mm (thickness: 1 mm)

PET film (adhesive part): 20 mm*75 mm (thickness: 50 um)

PET film (handle part): 20 mm*45 mm (thickness: 50 um)

Coating thickness: 50 um

UV light intensity: Mercury lamp, 2000 mJ/cm$^2$

For each of five compositions (Composition B1) prepared by the method of Comparative Example 1 and five compositions (Composition A1) prepared by the method of Embodiment 2, measurement was performed, and the average was obtained. The measurement results are shown in Table 3 below.

TABLE 3

| Coating resin | Coating state | Adhesion (unit: gf/cm) | | | | | |
| --- | --- | --- | --- | --- | --- | --- | --- |
| | | #1 | #2 | #3 | #4 | #5 | Average |
| Composition of Comparative Example 1 (Composition B1) | Cracking | 1 | 2 | 1 | 1 | 1 | 1.2 |
| Composition of Embodiment 2 (Composition A1) | Transparent/Good | 15 | 14 | 15 | 16 | 14 | 14.80 |

As shown in Table 3, which is the result of the adhesion test, when the 180° peel off test was performed after the composition (Composition B1) of Comparative Example 1 was coated and cured, cracks occurred on the coated surface immediately after curing, or peeling occurred on some samples after curing. As a result, peel off was caused by only an average of 1.2 gf/cm, which is a very weak force.

In contrast, when the 180° peel off test was performed after the composition (Composition A1) of Embodiment 2 was coated and cured, the coated surface after curing was transparent and good, no cracks occurred, and adhesion of 14 to 16 gf/cm was showed. As a result, peel off was caused by an average of 14.80 gf/cm.

As shown in the above results, it can be seen that the adhesive strength of the composition (Composition A1) of Embodiment 2 of the present invention is about 12 times stronger than that of the composition (Composition B1) of Comparative Example 1.

(2) Comparison of Flexibility

Each of the composition (Composition B1) of Comparative Example 1 and the composition (Composition A1) of Embodiment 2 was coated on a PET film, and after UV curing, the cured film was bent to measure the maximum radius of curvature at which cracks did not occur.

That is, the measurement of the inner radius of curvature is to measure the minimum radius of curvature at which cracks do not occur when the coated specimen is rolled and folded so that the coated surface is inward. The measurement was performed starting with a radius of curvature of 20 mm and folding it up to 0.5 mm while reducing the radius of curvature by 1 mm increments. The smaller the radius of curvature, the greater the flexibility of the composition.

On the contrary, the measurement of the outer radius of curvature is to measure the minimum radius of curvature at which cracks do not occur when the coated surface is rolled and folded to be outward. The measurement was performed from 20 mm to 0.5 mm in the same way as in the case of the inner measurement, and the smallest curvature without cracks was measured. The smaller the radius of curvature, the greater the flexibility of the composition.

PET film: 150 mm*200 mm (thickness: 100 um)
Coating thickness: 50 um
UV light intensity: Mercury lamp, 2000 mJ/cm$^2$ For each of five compositions (Composition B1) prepared by the method of Comparative Example 1 and five compositions (Composition A1) prepared by the method of Embodiment 2, measurement was performed, and the average was obtained.

The measurement results are shown in Table 4 below.

TABLE 4

| Coating resin | Bending direction | Radius of curvature (unit: mm) | | | | | |
|---|---|---|---|---|---|---|---|
| | | #1 | #2 | #3 | #4 | #5 | Average |
| Composition of Comparative Example 1 (Composition B1) | Inner | 20 | 20 | 15 | 15 | 15 | 17.00 |
| | Outer | 20 | 20 | 20 | 20 | 20 | 20.00 |
| Composition of Embodiment 2 (Composition A1) | Inner | 0.5 | 0.5 | 1.0 | 0.5 | 0.5 | 0.60 |
| | Outer | 2.0 | 3.0 | 2.0 | 2.0 | 2.0 | 2.20 |

As shown in Table 4, in the case of the composition (Composition B1) of Comparative Example 1, cracks occurred due to shrinkage. That is, cracks and coating film lifting occurred at the outer curvature radius R 20 mm of the maximum measurement range to the outside, indicating that all five compositions (composition B1) were relatively flat, and in some specimens, cracks and coating film lifting occurred at the outer curvature radius R 15 mm. That is, in the case of the composition (composition B1) of Comparative Example 1, both cracks and coating film lifting occurred between the curvature radii of R 20 mm and R 15 mm, which represent relatively flatness.

In contrast, in the case of the composition (composition A1) of Embodiment 2, the radius of curvature at which cracks and coating film lifting occur is R 0.5 mm to 1.0 mm in the case of the inner and R 2.0 mm to 3 mm in the case of the outer. This means that cracks and coating film lifting do not occur until the radius of curvature R 0.5 mm or the radius of curvature R 3 mm, which is very small. This indicates that the composition (composition A1) of Embodiment 2 of the present invention has excellent flexibility (bendability), and in particular, it shows excellent flexibility about 10 to 40 times as compared to the composition (Composition B1) of Comparative Example 1.

As such, cracks or lifting phenomena in the inner or outer radius of curvature as in the composition of the present invention can be regarded as meaning that cracks or lifting caused by shrinkage hardly occur in the product to which the composition of the present invention is applied.

(3) Comparison of Shrinkage Rate

In a liquid phase, the densities of the composition (Composition B1) of Comparative Example 1 and the composition (Composition A1) of Embodiment 2 were measured. Each composition of 10 g was placed in an aluminum dish and UV-cured, and a solid phase density was measured. After that, each shrinkage was calculated by calculating a difference between the liquid phase density and the solid phase density.

Aluminum dish: Ø50 mm*10 mm
UV light intensity: Mercury lamp, 2000 mJ/cm$^2$ $$\text{Shrinkage rate } (\%) = \{1 - (\text{liquid density/solid density})\} * 100$$

For each of five compositions (Composition B1) prepared by the method of Comparative Example 1 and five compositions (Composition A1) prepared by the method of Embodiment 2, the liquid density and the solid density were measured and the shrinkage rate was calculated. Then the average was obtained.

The measurement and calculation results are shown in Table 5 below.

TABLE 5

| Coating resin | Classification (unit) | Density and Shrinkage rate | | | | | |
|---|---|---|---|---|---|---|---|
| | | #1 | #2 | #3 | #4 | #5 | Average |
| Composition of Comparative Example 1 (Composition B1) | Liquid density (g/cm$^3$) | 1.201 | 1.206 | 1.203 | 1.202 | 1.205 | 1.203 |
| | Solid density (g/cm$^3$) | 1.278 | 1.284 | 1.280 | 1.277 | 1.284 | 1.281 |
| | Shrinkage rate (%) | 6.03 | 6.07 | 6.02 | 5.87 | 6.15 | 6.03 |
| Composition of Embodiment 2 (Composition A1) | Liquid density (g/cm$^3$) | 1.081 | 1.079 | 1.080 | 1.081 | 1.081 | 1.080 |
| | Solid density (g/cm$^3$) | 1.090 | 1.087 | 1.089 | 1.091 | 1.089 | 1.089 |
| | Shrinkage rate (%) | 0.83 | 0.74 | 0.83 | 0.92 | 0.73 | 0.81 |

As shown in Table 5, the average shrinkage rate after UV curing of the composition (Composition B1) of Comparative Example 1 showed a relatively high shrinkage rate of 6.03%. It seems that this shrinkage causes a decrease in adhesion and a decrease in flexibility (see the comparison of adhesion test in Table 3 and the comparison of flexibility in Table 4).

In contrast, in the case of the composition (composition A1) of Embodiment 2, the average shrinkage rate was 0.81%, showing a very low shrinkage rate even after UV curing. As a result, it seems to exhibit excellent adhesion and flexibility (see the comparison of adhesion test in Table 3 and the comparison of flexibility in Table 4).

<Comparison of Physical Properties Between the Composition (A2) of the Present Invention and the Conventional Composition (B2)>

(1) Comparison of Shrinkage Rate

In a liquid phase, the densities of the composition (Composition B2) of Comparative Example 2 and the composition (Composition A2) of Embodiment 3 were measured. Each composition of 10 g was placed in an aluminum dish and UV-cured, and a solid phase density was measured. After that, each shrinkage was calculated by calculating a difference between the liquid phase density and the solid phase density.

Aluminum dish: Ø50 mm*10 mm
UV light intensity: Mercury lamp, 2000 mJ/cm$^2$ $$\text{Shrinkage rate (\%)} = \{1 - (\text{liquid density/solid density})\} * 100$$

For each of five compositions (Composition B2) prepared by the method of Comparative Example 2 and five compositions (Composition A2) prepared by the method of Embodiment 3, the liquid density and the solid density were measured and the shrinkage rate was calculated. Then the average was obtained.

The measurement and calculation results are shown in Table 6 below.

TABLE 6

| Coating resin | Classification (unit) | Density and Shrinkage rate | | | | | |
|---|---|---|---|---|---|---|---|
| | | #1 | #2 | #3 | #4 | #5 | Average |
| Composition of Comparative Example 1 (Composition B1) | Liquid density (g/cm$^3$) | 1.245 | 1.249 | 1.244 | 1.246 | 1.247 | 1.246 |
| | Solid density (g/cm$^3$) | 1.300 | 1.305 | 1.301 | 1.304 | 1.302 | 1.302 |
| | Shrinkage rate (%) | 4.23 | 4.29 | 4.38 | 4.45 | 4.22 | 4.32 |
| Composition of Embodiment 2 (Composition A1) | Liquid density (g/cm$^3$) | 1.108 | 1.107 | 1.108 | 1.107 | 1.105 | 1.107 |
| | Solid density (g/cm$^3$) | 1.120 | 1.121 | 1.121 | 1.119 | 1.118 | 1.120 |
| | Shrinkage rate (%) | 1.07 | 1.25 | 1.16 | 1.07 | 1.16 | 1.14 |

As shown in Table 6, the average shrinkage rate after UV curing of the composition (composition B2) of Comparative Example 2 was 4.32%, showing a relatively high shrinkage rate, whereas the average shrinkage rate of the composition (composition A2) of Embodiment 3 of the present invention was 1.14%. That is, the composition (Composition A2) of Embodiment 3 of the present invention shows about 4 times less shrinkage after UV curing than the conventional composition (Composition B2) of Comparative Example 2.

INDUSTRIAL APPLICABILITY

As described above, the composition containing the novel meta-POSS compound of the present invention has excellent adhesion, flexibility (bendability), and shrinkage rate after UV curing, compared to the prior art. Thus, it can be applied to semiconductor encapsulation materials as well as optical materials, coating agents, low dielectric constant materials, medical materials, and has high industrial applicability.

The invention claimed is:

1. A preparation method of a novel POSS-modified (polyhedral oligomeric silsesquioxane-modified) polysiloxane compound including a structural unit of Si—O-alkylene-O—Si— and represented by Chemical Formula 1 below,

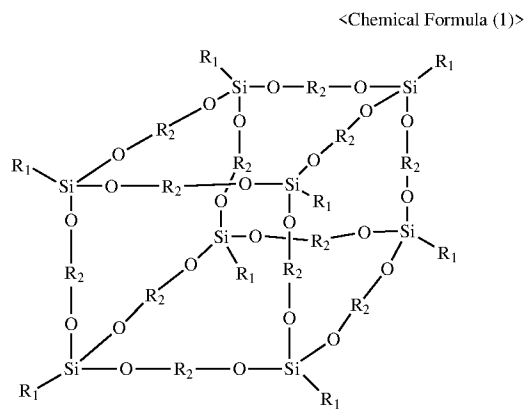

<Chemical Formula (1)> in Chemical Formula 1, R1 is a 3-ACRYLOXYPROPYL, METHACRYLOXYPROPYL, METHACRYLOXYMETHYL, 3-AMINOPROPYL, 4-AMINOBUTYL, m-AMINOPHENYL, 2-(3,4-EPOXYCYCLOHEXYL)ETHYL, 3-GLYCIDOXYPROPYL, 3-MERCAPTOPROPYL, ALLYL, HEXENYL, 7-OCTENYL, METHYL, or PHENYL group, and R2 is an alkylene group having C1 to C15 carbon atoms), comprising:

i) a step of reacting silane and diol in a diluent solvent using a catalyst ('reaction step'); and
ii) a step of leaving a reaction mixture of the reaction step i) to be cooled and purifying the reaction mixture in vacuum ('purification step'), wherein the silane is any one of organo trialkoxy silane-based compounds represented by General Formula (2) below, R1Si(OR3)3  <General Formula (2)> where R1 is, as an organic group, 3-ACRYLOXYPROPYL, METHACRYLOXYPROPYL, METHACRYLOXYMETHYL, 3-AMINOPROPYL, 4-AMINOBUTYL, m-AMINOPHENYL, 2-(3,4-EPOXYCYCLOHEXYL)ETHYL, 3-GLYCIDOXYPROPYL, 3-MERCAPTOPROPYL, ALLYL, HEXENYL, 7-OCTENYL, METHYL, or PHENYL group, and R3 is a substituted or unsubstituted C1-C15 alkyl group, and wherein the diol is any one of substituted or unsubstituted linear or branched diols having C1 to C15 carbon atoms.

2. The preparation method of claim 1, wherein
  a used amount of the diluent solvent is 30 to 70% by weight of a total amount (parts by weight, wt) of the catalyst, the diluent solvent, the silane, and the diol,
  a used amount of the silane is 15 to 40% by weight of the total amount (parts by weight, wt) of the catalyst, the diluent solvent, the silane, and the diol,
  a used amount of the diol is 10 to 30% by weight of the total amount (parts by weight, wt) of the catalyst, the diluent solvent, the silane, and the diol,
  a used amount of the catalyst is 0.01 to 5% by weight of a total amount (parts by weight, wt) of the catalyst, the diluent solvent, the silane, and the diol, and
  a ratio (molar ratio) of the used amount of the silane to the used amount of the diol is 2:3.

3. The preparation method of claim 1, wherein the diluent solvent is one or more selected from linear or branched C1 to C6 alcohols such as methanol, ethanol, propanol, isopropanol, n-butanol, iso-butanol, t-butanol, n-pentanol, iso-pentanol, and hexanol; and ketones such as acetone, MEK, and MIBK.

4. The preparation method of claim 1, wherein the silane is one selected from following silane compounds:
  (3-ACRYLOXYPROPYL) TRIMETHOXY SILANE, [4369-14-6]
  METHACRYLOXYPROPYL TRIMETHOXY SILANE, [2530-85-0]
  METHACRYLOXYMETHYL TRIETHOXY SILANE, [5577-72-0]
  METHACRYLOXYMETHYL TRIMETHOXY SILANE, [54586-78-6]
  METHACRYLOXYPROPYL TRIETHOXY SILANE, [21142-29-0]
  3-AMINOPROPYL TRIETHOXY SILANE, [919-30-2]
  3-AMINOPROPYL TRIMETHOXY SILANE, [13822-56-5]
  4-AMINOBUTYL TRIETHOXY SILANE, [3069-30-5]
  m-AMINOPHENYL TRIMETHOXY SILANE, [70411-42-6]
  2-(3,4-EPOXYCYCLOHEXYL)ETHYL TRIETHOXY SILANE, [10217-34-2]
  2-(3,4-EPOXYCYCLOHEXYL)ETHYL TRIMETHOXY SILANE, [3388-04-3]
  (3-GLYCIDOXYPROPYL) TRIMETHOXY SILANE, [2530-83-8]
  (3-GLYCIDOXYPROPYL) TRIETHOXY SILANE, [2602-34-8]
  3-MERCAPTOPROPYLTRIMETHOXYSILANE, [4420-74-0]
  3-MERCAPTOPROPYLTRIETHOXYSILANE, [14814-09-6]
  ALLYLTRIMETHOXYSILANE, [2551-83-9]
  HEXENYLTRIETHOXYSILANE, [52034-14-7]
  7-OCTENYLTRIMETHOXYSILANE, [52217-57-9]
  METHYL TRIMETHOXY SILANE, [1185-55-3]
  METHYL TRIETHOXY SILANE, [2031-67-6]
  PHENYL TRIETHOXY SILANE, [780-69-8]
  PHENYL TRIMETHOXY SILANE, [2996-92-1].

5. The preparation method of claim 4, wherein the diol is one selected from following diols:
  1,2-Ethanediol
  1,3-Propanediol
  1,4-Butanediol
  1,5-Pentanediol
  1,6-Hexanediol
  1,8-Octanediol
  1,10-Decanediol
  1,12-Dodecanediol.

6. The preparation method of claim 1, wherein the catalyst is any one or more selected from catalysts including strong acids such as HCl, HNO3, and H2SO4; strong bases such as NaOH, KOH, and BaOH; and ammonium salts such as TMAH (Tetra Methyl Ammonium Hydroxide), TMAA (Tetra Methyl Ammonium Acetate), TMAF (Tetra Methyl Ammonium Fluoride), TEAH (Tetra Ethyl Ammonium Hydroxide), TEAA (Tetra Ethy 1Ammonium Acetate), TEAF (Tetra Ethyl Ammonium Fluoride), TBAH (Tetra Butyl Ammonium Hydrocide), TBAA (Tetra Butyl Ammonium Acetate), and TBAF (Tetara Butyl Ammonium Fluoride).

7. The preparation method of claim 1, wherein the reaction step i) includes (a) a raw material input step; (b) a temperature raising and heating step; and (c) a synthesis step,
  the raw material input step (a) is a step of inputting a diluent solvent, a silane compound, and a diol into a reactor, and adding a catalyst while stirring at room temperature,
  the temperature raising and heating step (b) is a step of raising a reaction temperature of a reaction mixture of the raw material input step (a) to 60 to 100° C.,
  the synthesis step (c) is a step of continuing a reaction while maintaining the reaction temperature raised in the heating and temperature raising step (b),
  in the synthesis step (c), a synthesis reaction proceeds while adding and replenishing a diluent solvent into the reactor by the amount of the diluent solvent volatilized during the reaction, and the diluent solvent is added during ⅓ to ½ of the total reaction time in an amount of 5% to 30% by weight of the amount of the solvent initially used.

8. The preparation method of claim 1, wherein the purification step ii) includes a step of leaving a reaction mixture of the reaction step i) to be cooled at a temperature below room temperature and then purifying the reaction mixture in vacuum.

9. A composition comprising the novel POSS-modified polysiloxane compound prepared by the preparation method of claim 1.

10. The composition of claim 9, further comprising a diluent monomer, an initiator, and an additive,
  wherein the diluent monomer is one or more selected from an acryl-based diluent monomer;
  an epoxy-based diluent monomer; an amine-based silane diluent monomer; an acrylic-epoxy-based diluent monomer; an epoxy-based diluent monomer containing a double bond; and a halogen-based diluent monomer,
  wherein the initiator is one or more selected from following compound group:
    BENZIL DIMETHYL KETAL
    HYDROXY CYCLOHEXYL PHENYL KETONE
    HYDROXY DIMETHYL ACETOPHENONE
    METHYL-[METYLTHIO PHENYL]-MORPHOLINE PROPANONE
    2,4-DIETHYLTHIOXANETHONE
    ETHYL-4-DIMETHYLAMINOBENZOATE
    BENZOPHENONE
    4-PHENYLBENZOPHENONE
    2,4,6-TRIMETHYLBENZOYL-DIPHENYL PHOSPHINE
    METHYL BENZYLFORMATE Bis [4-n-alkyl(C10~13)phenyl]iodonium Hexafluorophosphate Bis [a-n-alkyl(C10~13)phenyl]iodonium Hexafluoroantimonate Bis (4-tert-butylphenyl)iodium hexafluorophosphate Bis [4-n-alkyl(C10~13)phenyl]iodonium tetrakispentafluorophenyl borate 1,2-Dicyclohexyl-4,4,5,5-tetramethylbiguanidium n-butyltriphenyl borate

IODONIUM, (4-METHYLPHENYL) [4-(2-METHYLPROPYL) PHENYL]-, HEXAFLUORO PHOSPHATE, wherein the additive is one or more selected from following compound group:
 polysiloxanes (silicones additives)
 polyacrylates (acrylate additives)
 Polyether modification polysiloxane
 Silicone macromers
 Polymethylalkylsiloxanes
 thermostable modified polysiloxane
 Reactive silicones
 polyether-modified dimethylsiloxanes
 Copolymer of acrylate epoxy urethane
 Copolymer adsorbed on silicon dioxide
 Solution of modified alkylene copolymer
 Solution of a hydroxy functional copolymer with acidic groups
 Solution of modified polyether (2-methoxy-1-methylethyl acetate)
 Carboxylated Linear Low Density Polyethylene (maleicanydride).

11. The composition of claim 9, wherein the novel POSS-modified polysiloxane compound has a molecular weight of 1,500 to 20,000.

12. The composition of claim 10, wherein the novel POSS-modified polysiloxane compound has 40 wt % to 95 wt % of the total composition,
 the diluent monomer has 1 wt % to 40 wt % of the total composition,
 the initiator has 0.1 wt % to 5 wt % of the total composition, and
 the additive has 0.1 wt % to 15 wt % of the total composition.

13. The composition of claim 10, wherein the acryl-based diluent monomer is one or more selected from following compound group:
 METHACRYLOXY PROPYL TRIMETHOXY SILANE
 (3-ACRYLOXYPROPYL) TRIMETHOXYSILANE
 METHACRYLOXYMETHYLTRIMETHOXYSILANE
 (METHACRYLOXYMETHYL)BIS(TRIMETHYLSILOXY)METHYLSILANE
 (3-ACRYLOXYPROPYL)METHYLDIMETHOXYSILANE
 (3-ACRYLOXYPROPYL)METHYLDIETHOXYSILANE
 METHACRYLOXYPROPYLMETHYLDIMETHOXYSILANE
 METHACRYLOXYPROPYLMETHYLDIETHOXYSILANE
 METHACRYLOXYPROPYLDIMETHYLMETHOXYSILANE
 METHACRYLOXYPROPYLDIMETHYLETHOXYSILANE
 (ACRYLOXYMETHYL)PHENETHYLTRIMETHOXYSILANE
 (METHACRYLOXYMETHYL)DIMETHYLETHOXYSILANE
 METHACRYLOXYPROPYLTRIETHOXYSILANE
 (METHACRYLOXYMETHYL)METHYLDIMETHOXYSILANE
 METHACRYLOXYMETHYLTRIETHOXYSILANE
 ACRYLOXYMETHYLTRIMETHOXYSILANE
 METHACRYLOXYPROPYLTRIISOPROPOXYSILANE
 METHACRYLOXYMETHYLTRIS(TRIMETHYLSILOXY)SILANE
 (3-ACRYLOXYPROPYL)TRIS(TRIMETHYLSILOXY)SILANE
 (3-ACRYLOXYPROPYL)METHYLBIS(TRIMETHYLSILOXY)SILANE
 3-METHACRYLOXYPROPYLTRIACETOXYSILANE
 METHACRYLOXYPROPYLMETHYLDICHLOROSILANE
 (3-ACRYLOXYPROPYL)DIMETHYLMETHOXYSILANE
 (2-ACRYLOXYETHOXY) TRIMETHYLSILANE
 ACRYLOXYTRIISOPROPYLSILANE
 1,3-BIS(METHACRYLOXY)-2-TRIMETHYLSILOXYPROPANE
 1,3-BIS (3-METHACRYLOXYPROPYL)TETRAKIS (TRIMETHYLSILOXY) DISILOXANE
 O-(METHACRYLOXYETHYL)-N-(TRIETHOXYSILYLPROPYL) CARBAMATE
 O-(METHACRYLOXYETHOXY)CARBAMOYLPROPYLMETHYLDIMETHOXY SILANE
 N-(3-METHACRYLOXY-2-HYDROXYPROPYL)-3-AMINOPROPYLTRIETHOXYSILANE.

14. The composition of claim 10, wherein the epoxy-based diluent monomer is one or more selected from following compound group:
 (3-GLYCIDOXYPROPYL)TRIMETHOXYSILANE
 2-(3,4-EPOXYCYCLOHEXYL)ETHYLTRIMETHOXYSILANE
 (3-GLYCIDOXYPROPYL)TRIETHOXYSILANE
 (3-GLYCIDOXYPROPYL)METHYLDIMETHOXYSILANE
 (3-GLYCIDOXYPROPYL)METHYLDIETHOXYSILANE
 2-(3,4-EPOXYCYCLOHEXYL)ETHYLTRIETHOXYSILANE
 5,6-EPOXYHEXYLTRIETHOXYSILANE
 (3-GLYCIDOXYPROPYL)DIMETHYLETHOXYSILANE
 2-(3,4-EPOXYCYCLOHEXYL)ETHYLMETHYLDIETHOXYSILANE
 8-GLYCIDOXYOCTYLTRIMETHOXYSILANE
 1-(3-GLYCIDOXYPROPYL)-1,1,3,3,3-PENTAETHOXY-1,3-DISILAPROPANE.

15. The composition of claim 10, wherein the amine-based diluent monomer is one or more selected from following compound group:
 N-(2-AMINOETHYL)-3-AMINOPROPYLMETHYLDIMETHOXYSILANE
 (3-(N-ETHYLAMINO)ISOBUTYL)TRIMETHOXYSILANE
 3-AMINOPROPYLTRIMETHOXYSILANE.

16. The composition of claim 10, wherein the acrylic-epoxy-based diluent monomer is one or more selected from following compound group:
 Glycidyl methacrylate
 Glycidyl Acrylate
 (3,4-Epoxycyclohexyl)methyl Acrylate
 (3,4-Epoxycyclohexyl)methyl methacrylate.

17. The composition of claim 10, wherein the epoxy-based diluent monomer containing a double bond is one or more selected from following compound group:
Allyl glycidyl ether
1,2-Epoxy-4-vinylcyclohexane
2-Vinyloxytetrahydropyran
3-[(Allyloxy)methyl]-3-ethyloxetane
1,3-Butadiene Monoepoxide
1,2-Epoxy-9-decene
1,2-Epoxy-5-hexene.

18. The composition of claim 10, wherein the halogen-based diluent monomer is one or more selected from following compound group:
2-Perfluorobutyl ethyl acrylate
2-Perfluorohexyl ethyl acrylate
2-Perfluorooctyl ethyl acrylate
2-Perfluorodecyl ethyl acrylate
3-(Perfluorobutyl)propyl acrylate
3-Perfluorooctyl porpyl acrylate
2-Perfluorobutyl ethyl methacrylate
2-Perfluorohexyl ethyl methacrylate
2-Perfluorooctyl ethyl methacrylate
2-Perfluorodecyl ethyl methacrylate
3-Perfluorobutyl propyl methacrylate
3-Perfluorohexyl propyl methacrylate
3-Perfluorooctyl propyl methacrylate
1H, 1H,5H-Octafluoropentyl methacrylate
1H, 1H,2H,2H-Perfluorodecyltriethoxysilane
1H,1H,2H,2H-Perfluorodecyltrimethoxysilane
1H, 1H,2H,2H-Perfluorodecyltrichlorosilane
Perfluorohexyl propyl epoxide
Perfluorooctyl propyl epoxide
2-Perfluorobutyl ethyl alcohol
2-Perfluorohexyl ethyl alcohol
2-Perfluorooctyl ethyl alcohol
2-Perfluorohexyl ethyl thiol
2-Perfluorooctyl ethyl thiol.

19. The composition of claim 10, wherein one or more additives selected from additives including a curing retardant for storage stability of the composition; an adhesion accelerator for improving adhesion; an inorganic filler; a pigment; a phosphor; a coloring agent; a heat resistance improver; a release agent; and a dispersant for a packaging material are further added to the additive.

20. A hard coating material comprising the composition of claim 9.

21. A low dielectric constant material comprising the composition of claim 9.

22. A medical material comprising the composition of claim 9.

23. An optical material comprising the composition of claim 9.

* * * * *